United States Patent
Ispas (10) Patent No.: US 9,489,023 B1
(45) Date of Patent: Nov. 8, 2016

(54) SECURE WAKE ON LAN WITH WHITE LIST

(71) Applicant: MARVELL INTERNATIONAL LTD., Hamilton (BM)

(72) Inventor: Iulian Andrei Ispas, Weingarten-Baden (DE)

(73) Assignee: MARVELL INTERNATIONAL LTD. (BM)

( * ) Notice: Subject to any disclaimer, the term of this patent is extended or adjusted under 35 U.S.C. 154(b) by 192 days.

(21) Appl. No.: 14/334,706

(22) Filed: Jul. 18, 2014

Related U.S. Application Data (60) Provisional application No. 61/847,980, filed on Jul. 18, 2013.

(51) Int. Cl.
*G06F 1/00* (2006.01)
*G06F 1/26* (2006.01)
*G06F 7/04* (2006.01)
*G06F 21/44* (2013.01)
*H04L 29/06* (2006.01)
*H04L 9/32* (2006.01)

(52) U.S. Cl.
CPC ............... *G06F 1/26* (2013.01); *G06F 21/44* (2013.01); *H04L 9/32* (2013.01); *H04L 63/101* (2013.01)

(58) Field of Classification Search
CPC ........... G06F 1/26; G06F 21/44; H04L 9/32; H04L 63/101
See application file for complete search history.

(56) References Cited

U.S. PATENT DOCUMENTS

| | | | | |
|---|---|---|---|---|
| 5,983,353 A * | 11/1999 | McHann, Jr. | ......... | G06F 1/3209 713/310 |
| 6,292,890 B1 * | 9/2001 | Crisan | .................... | G06F 9/4416 709/220 |
| 6,493,824 B1 * | 12/2002 | Novoa | .................... | H04L 12/12 709/203 |
| 6,606,709 B1 * | 8/2003 | Connery | .................... | G06F 1/26 713/178 |
| 7,248,146 B1 * | 7/2007 | Kammer | ............... | G06F 1/3203 340/286.01 |
| 8,060,916 B2 * | 11/2011 | Bajaj | ..................... | H04L 9/3213 713/168 |
| 8,214,902 B2 * | 7/2012 | Khosravi | .............. | G06F 21/565 326/12 |
| 8,631,488 B2 * | 1/2014 | Oz | .......................... | G06F 21/57 726/22 |
| 8,811,247 B2 * | 8/2014 | Thomson | ............... | H04B 1/005 370/311 |
| 9,262,195 B2 * | 2/2016 | Tsirkin | ................ | G06F 9/45558 |
| 2008/0004011 A1 * | 1/2008 | Ober | ................... | H04L 63/0272 455/435.1 |
| 2011/0202983 A1 * | 8/2011 | Pope | ..................... | G06F 21/572 726/7 |
| 2011/0320798 A1 * | 12/2011 | Zimmer | .................. | G06F 21/14 713/2 |
| 2013/0089015 A1 * | 4/2013 | Choong | ............ | H04W 52/0216 370/311 |
| 2014/0156994 A1 * | 6/2014 | Sakuma | .................. | G06F 21/31 713/171 |
| 2015/0237658 A1 * | 8/2015 | Fontaine | ............... | H04W 76/02 370/311 |
| 2015/0286813 A1 * | 10/2015 | Jakobsson | ............... | G06F 21/35 726/9 |

* cited by examiner

Primary Examiner — Mark Connolly (57) ABSTRACT

Systems, methods, and other embodiments associated with secure Wake on LAN with white list are described. According to one embodiment, an apparatus includes memory and sleep manager logic. The memory is configured to store a white list. The white list includes credentials for entities that are authorized to wake a host device from a power-saving sleep mode. The sleep manager logic is configured to receive, from a requesting entity, a request to wake the host device and determine if credentials for the requesting entity are on the white list. The sleep manager logic is configured to wake the host device when credentials for the requesting entity are on the white list and refrain from waking the host device when credentials for the requesting entity are not on the white list.

20 Claims, 5 Drawing Sheets

SECURE WAKE ON LAN WITH WHITE LIST

CROSS REFERENCE TO RELATED APPLICATIONS

This patent disclosure claims the benefit of U.S. Provisional Application Ser. No. 61/847,980 filed on Jul. 18, 2013, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Most network enabled computer devices (e.g., personal computers, laptops, TV sets, printers, smart phones, routers, and so on) are designed to enter a low power "sleep" state when the device is inactive for some period of time or under other circumstances set by a user. To cause a sleeping device to enter an active state, a user can "wake up" the device by physically interacting with the device in some manner (e.g., pressing a button, opening a laptop's lid, and so on). Some devices can be woken up via a request (e.g., a "wake-up packet" sometimes called a "magic packet") that is received from another device in the local area network (LAN). This feature is called Wake on LAN (WOL).

SUMMARY

In general, in one aspect this specification discloses an apparatus that provides secure Wake on Lan with white list. The apparatus includes memory and sleep manager logic. The memory is configured to store a white list. The white list includes credentials for entities that are authorized to wake a host device from a power-saving sleep mode. The sleep manager logic is configured to receive, from a requesting entity, a request to wake the host device and determine if credentials for the requesting entity are on the white list. The sleep manager logic is configured to wake the host device when credentials for the requesting entity are on the white list and refrain from waking the host device when credentials for the requesting entity are not on the white list.

In general, in another aspect, this specification discloses a method for providing secure Wake on Lan with white list. The method includes receiving a request from a requesting entity to wake a host device and accessing a white list that includes credentials for entities that are authorized to wake the host device. The method includes determining if credentials for the requesting entity are on the white list; waking the host device when the credentials for the requesting entity are on the white list; and refraining from waking the host device when the credentials for the requesting entity are not on the white list.

In general, in another aspect, this specification discloses a device that provides secure Wake on Lan with white list. The device includes a network interface controller and a network CPU. The network interface controller includes security interface logic configured input a white list that includes credentials for entities that are authorized to wake the device from a power-saving sleep mode. The network CPU includes memory and sleep manager logic. The memory is configured to store a white list. The white list includes credentials for entities that are authorized to wake a host device from a power-saving sleep mode. The sleep manager logic is configured to receive, from a requesting entity, a request to wake the host device and determine if credentials for the requesting entity are on the white list. The sleep manager logic is configured to wake the host device when credentials for the requesting entity are on the white list and refrain from waking the host device when credentials for the requesting entity are not on the white list.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Basic WOL allows a device to be woken by any entity that knows the information about the device that is required for the wake-up packet (e.g., the device's MAC address). To provide additional security for WOL, some management solutions implement custom cryptographic communication protocols that are established for servers and clients in a particular network. The customized solutions to secure WOL is not well suited for many small (e.g., home) LANs. Another approach to providing secure WOL is to password protect a device's WOL feature by requiring a device's WOL password to be included the wake up packet. However, because the password is included in packets sent in the LAN, the password can be easily intercepted by a malicious device and used to wake up the device.

Described herein are examples of systems, methods, and other embodiments associated with providing secure WOL for a device by storing a white list in a sleeping device's memory. The white list includes credential for entities (e.g., users, companies, intelligent devices, and so on) that have been authorized to wake the device. The white list is accessible to a sleep manager application on the device that monitors packets on the LAN when the device is asleep. The sleep manager application wakes the device from the sleep state in response to a request (e.g., wake up packet) being received from an entity having credentials listed on the white list. In one embodiment, the white list stores one or more cryptographic authentication credentials (e.g., secure sockets layer (SSL) certificate, public encryption key, and so on) for each authorized entity that can be used to authenticate and establish a secure connection with the device.

For the purposes of this description, the term "credential" encompasses security credentials that are allocated to a unique entity in a secure manner and serve as proof of the entity's identity. Credentials include usernames, passwords, security certificates, encryption keys, authentication procedures, and so on. The term "entity" encompasses a real person, company, organization, virtual person, intelligent device, and so on.

Figure 1:
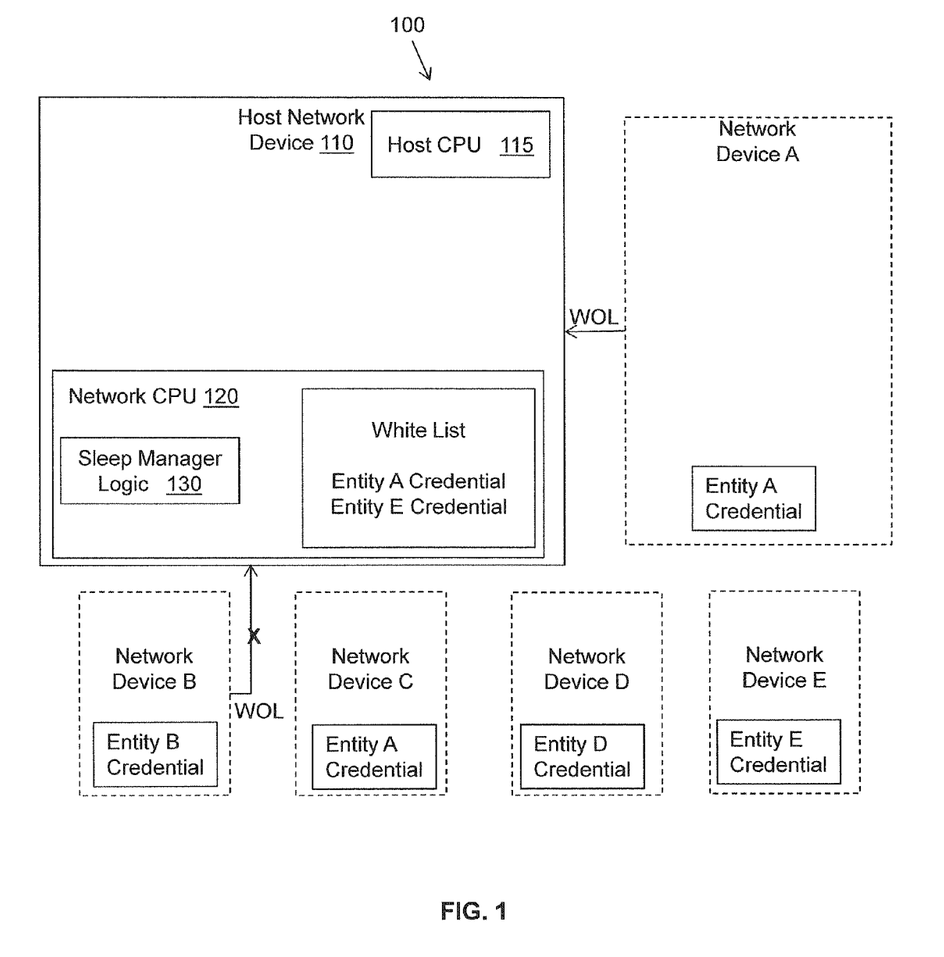
FIG. 1 illustrates one embodiment of an apparatus associated with secure WOL using a white list.

With reference to FIG. 1, one embodiment of a system 100 is shown that includes a host network device 110 configured to provide secure WOL. In addition to the host network device 110 the system 100 includes network devices A-E. Network devices A, C, and E used by entities that are authorized to wake the host network device 110. By way of example, the host network device 110 could be a laptop that belongs to a user (e.g., entity A) and the network device A could be the user's smart phone. The network device C could be the user's tablet and the network device E could be the laptop of the user's supervisor (e.g., entity E). Thus, the network devices A, C, and E have credentials identifying entities that are authorized to wake the host network device 110.

The network devices B and D belong to entities that not authorized to wake the host network device 110. The network devices B and D could be laptops belonging to the user's coworkers. Thus, the network devices B and D have credentials identifying entities that are not authorized to wake the host network device 110. Other examples of network devices include personal computers, TV sets, network attached storage (NAS), printers, session initiation protocol (SIP)/Skype enabled smart phones, routers, "smart" appliances, or any device that has communication functionality that enables the device to belong to a network.

The host network device 110 includes a host CPU 115 and a network CPU 120. The host CPU 115 executes processes to perform the host network device's function. If the host network device is a laptop, the host CPU 115 executes processes that implement the device's operating system and so on. The host CPU 115 will enter the power-saving sleep mode during periods of inactivity. The network CPU 120 executes processes that are necessary to handle network communication. Because it serves a limited, specialized purpose, the network CPU can have less processing power than the device CPU 115. The network CPU 120 does not enter the sleep mode when the host CPU 115 enters the sleep mode. In one embodiment the network CPU 120 is an embedded processor in a network interface controller (NIC). The NIC can have a wired interface (e.g., Ethernet or power line) or a wireless interface (e.g., WiFi or Bluetooth) to the other network devices.

A white list is stored in memory associated with the network CPU 120. In one embodiment illustrated in more detail in FIGS. 2 and 3, the white list is received from an authorization manager application when the host CPU 115 is entering the sleep mode. The white list lists credentials for entities that are authorized to wake the host network device 110. In FIG. 1, the white list includes credentials for entities A and E.

Sleep manager logic 130 manages the host device's interaction with other devices while the host device 110 is asleep. In one embodiment, the sleep manager logic 130 is an application running on the network CPU 120. When a request is received from a network device to wake the host network device 110, the sleep manager logic 130 accesses the white list. The sleep manager logic 130 is configured to wake the host CPU 115 when a WOL request is received from an entity having credentials on the white list.

When a wake up request (e.g., wake up packet or magic packet) is received, the sleep manager logic 130 checks credentials of the entity that sent the wake up request. If the entity's credentials are on the white list, the sleep manager logic 130 wakes the host network device 110. As shown in FIG. 1, when a wake up request (e.g., wake up packet or magic packet) is received from entity A via network device A, the sleep manager logic 130 wakes the host network device 110. When a wake up request is received from entity B via network device B, the sleep manager logic 130 does not wake the host network device 110.

Figure 2:
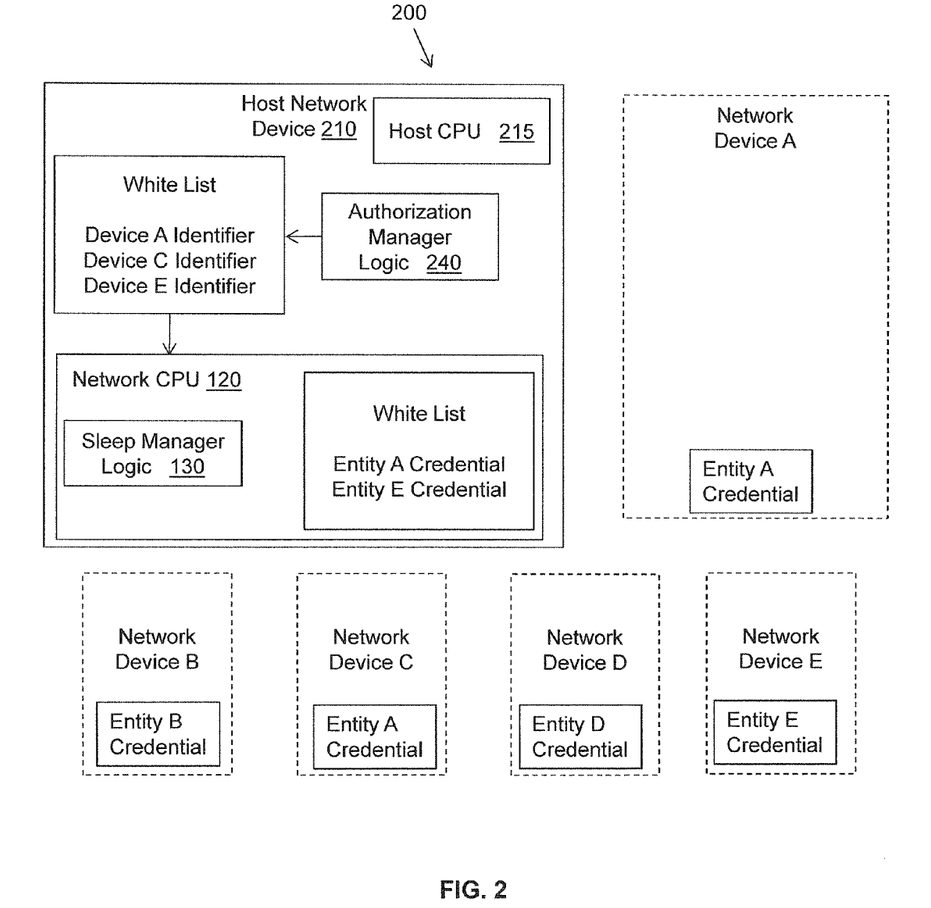
FIG. 2 illustrates another embodiment of an apparatus associated with secure WOL using a white list.

FIG. 2 illustrates one embodiment of a system 200 that includes a host network device 210 that provides secure WOL. The host network device 210 includes a host CPU 215 and authorization manager logic 240. The authorization manager logic 240 controls access by entities to the host network device 210. The authorization manager logic 240 maintains the white list by storing credentials for entities that are authorized to access the host network device 210 on the white list. While the host network device 210 is awake, the authorization manager logic 240 limits access to the host network device 210 to only those entities whose credentials are on the white list. The authorization manager logic 240 is supported by the host CPU 215, which is separate from the network CPU 120.

When the host CPU 215 is preparing to enter sleep mode, the authorization manager logic 240 transfers the white list to the network CPU 120 for access by the sleep manager logic 130. In this manner, entities that are authorized to access the host network device 210 while the host network device 210 is awake will also be able to wake the host network device 210 from sleep mode.

In one embodiment, the credentials stored in the white list include one or more cryptographic authentication credentials that uniquely identify an entity and vouch for the entity's identity. For the purposes of this description, authentication credentials can include any information about an entity that is used to authenticate the identity of an entity prior to establishing a secure (encrypted) connection with the entity. The authentication credentials will include some type of cryptographic information such as encryption keys. Examples of authentication credentials include SSL certificates and public encryption keys that have been assigned to a network device by a certified authority.

The authorization manager logic 240 is configured to authenticate entities that have been authorized to access the host device 210. In one embodiment, the authorization manager logic 240 is configured to request authentication credentials from an entity being added to the white list and to store the authentication credentials in the white list. The authorization manager logic 240 may require that an entity's device be physically connected to the host device to be authorized. The white list may be maintained in FLASH memory to facilitate quick storage of binary files that correspond to authentication credentials.

Figure 3:
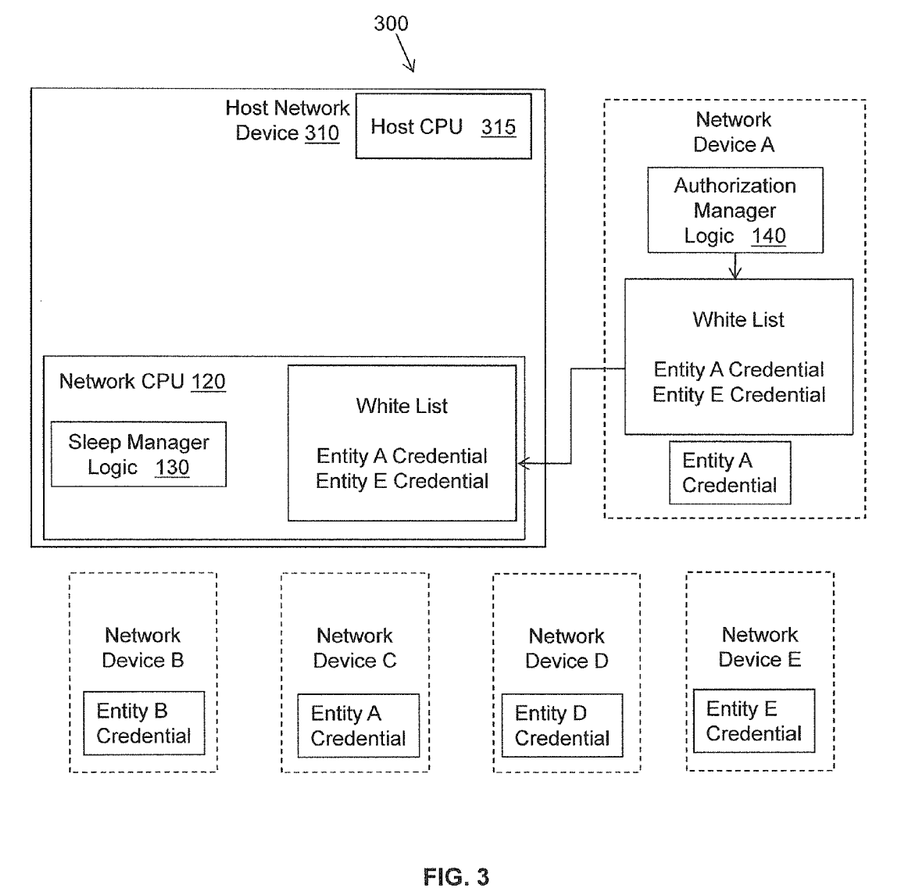
FIG. 3 illustrates another embodiment of an apparatus associated with secure WOL using a white list.

FIG. 3 illustrates one embodiment of a system 300 that includes a host network device 310 that provides secure WOL. The host network device 310 includes a host CPU 315 and a network CPU 120. The host CPU 315 executes processes to perform the host network device's function. If the host network device is a router, the host CPU 315 executes processes that parse packet headers and so on. The host CPU 315 will enter the power-saving sleep mode during periods of inactivity or device manufacturer prescribed power sleep periods. The network CPU 120 executes processes that are necessary to handle network communication. The network CPU 120 does not enter the sleep mode when the host CPU 315 enters the sleep mode.

A white list is stored in memory associated with the network CPU 120. In contrast to the embodiment illustrated in FIG. 2 the authorization manager logic 140 that maintains the white list resides in a different network device (e.g., network device A) from the host network device 315. The embodiment illustrated in FIG. 3 may be advantageous when the host device 310 does not have a user-friendly interface for compiling the white list by receiving credentials for entities that are being authorized to access the host device 310. When the host CPU 315 is not in sleep mode, the authorization manager logic 140 manages access to the host device 310. When the host CPU 315 is entering the sleep mode, the authorization manager logic 140 transfers the white list to the host device 315 for storage in memory associated with the network CPU 120. After the white list is stored, the host CPU 315 is able to handle secure WOL.

The sleep manager logic 130 manages the host device's interaction with other devices while the host device 310 is asleep. When a request is received from a network device to wake the host network device 310, the sleep manager logic 130 accesses the white list. The sleep manager logic 130 is configured to wake the host CPU 315 when a WOL request is received from a device having credentials for an entity on the white list.

Figure 4:
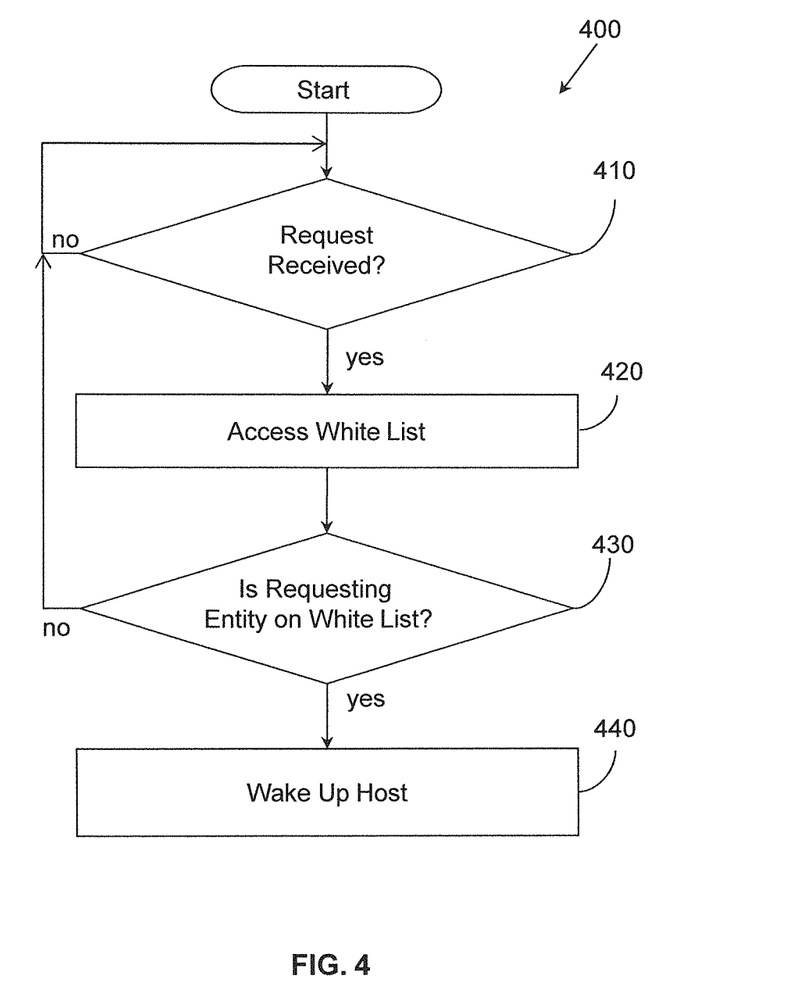
FIG. 4 illustrates one embodiment of a method associated secure WOL using a white list.

FIG. 4 illustrates one embodiment of a method 400 for providing secure WOL for a host device. The method 400 may be performed by the sleep manager logic 130 described with reference to FIGS. 1-3. The method includes, at 410, receiving a request from a requesting entity to wake a host device. At 420, the method includes accessing a white list that includes credentials for entities that are authorized to wake the host device. At 430, a determination is made as to whether credentials for the requesting entity are on the white list. When the credentials for the requesting entity are on the white list, at 440 the host device is woken. When the credentials for the requesting entity are not on the white list, the method returns to 410 and the host device is not woken.

In one embodiment, prior to the method accessing the white list at 420, an authentication procedure is performed to authenticate the requesting entity's identify (regardless of whether the requesting entity is on the white list). The method accesses the white list at 420 only when the requesting entity is authenticated.

In one embodiment, upon receiving the request to wake the host device, the method includes requesting an authentication credential from the requesting entity and matching the authentication credential to authentication credentials stored on the white list. In one embodiment, the method includes receiving the white list from authorization manager logic that uses the white list to manage access to the host device when the host device is not in the sleep mode.

Figure 5:
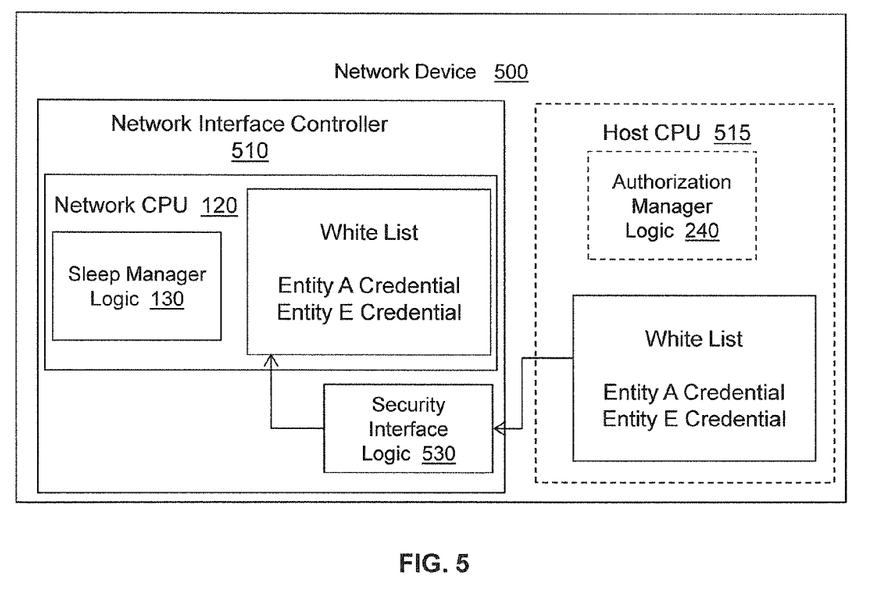
FIG. 5 illustrates one embodiment of a device associated with secure WOL using a white list.

FIG. 5 illustrates one embodiment of a network device 500 that provides secure WOL. The device 500 includes a network interface controller (NIC) 510 and a security interface logic 530. The security interface logic 530 is configured input a white list that lists credentials for entities that are authorized to wake the device 500 from a power-saving sleep mode. In one embodiment, the security interface logic 530 includes a shared or common register or memory. The NIC 510 includes a network CPU 120 that includes memory configured to store the white list and sleep manager logic 130. The sleep manager logic 130 is configured to receive a request from a requesting entity (not shown) to wake the device 500; determine if credentials for the requesting entity are on the white list; wake the device 500 when the credentials for the requesting entity are on the white list; and refrain from waking the device 500 when the credentials for the requesting entity are not on the white list.

In one embodiment, the device 500 includes a host CPU 515 that includes authorization manager logic 240 configured to generate the white list. The authorization manager logic 240 manages the white list and is able to add or remove credentials for the authorized entities on the white list. The authorization manager logic 240 uses the white list to manage access to the device 500 when the device is not in the sleep mode. When the host CPU 515 is preparing to enter the sleep mode, the authorization manager logic 240 transfers a copy of the white list to the sleep manager logic 130 by way of the secure interface logic 530.

When the Transport Layer Security (TLS) protocol is in use by the network, the sleep manager logic 130 acts as a server in relation to the TLS connections. The sleep manager logic 130 accepts a connection from an entity and requests a security certificate from the entity. The sleep manager logic 130 establishes a master key and verifies the entity. The entity signs the last message, which is a hash of all messages, with the secret key of its certificate. The sleep manager logic 130 verifies the signature using the entity's public key. If the signature is proper, a second verification is performed by hashing all the messages exchanged. If the second signature is proper, the TLS connection is maintained.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium" as used herein is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a RAM, a ROM, a memory chip or card, a memory stick, and other electronic media that can store computer instructions and/or data. Computer storage media described herein are limited to statutory subject matter under 35 U.S.C §101.

"Logic" as used herein includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C §101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C §101.

To the extent that the term "includes" or "including" is employed in the detailed description or the claims, it is intended to be inclusive in a manner similar to the term "comprising" as that term is interpreted when employed as a transitional word in a claim.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. §101.

What is claimed is:

1. An apparatus, comprising:
    memory configured to store a white list, wherein the white list includes credentials for entities that are authorized to wake a host device from a power-saving sleep mode;
    sleep manager logic configured to:
        receive, from a requesting entity, a request to wake the host device;
        determine if credentials for the requesting entity are on the white list; and
        wake the host device when the credentials for the requesting entity are on the white list
        wherein the sleep manager logic is configured to receive the white list from authorization manager logic that uses the white list to manage access to the host device when the host device is not in the power-saving sleep mode.

2. The apparatus of claim 1, wherein the credentials comprise a cryptographic authentication credential that uniquely identifies a device.

3. The apparatus of claim 2, wherein the authentication credential comprises a secure sockets layer (SSL) certificate.

4. The apparatus of claim 2, wherein the authentication credential comprises a public encryption key.

5. The apparatus of claim 2, wherein the sleep manager logic is configured to:
    upon receiving the request to wake the host device, request an authentication credential from the requesting entity; and
    match the authentication credential to authentication credentials stored on the white list.

6. The apparatus of claim 1, wherein the sleep manager logic is configured to refrain from waking the host device when credentials for the requesting entity are not on the white list.

7. The apparatus of claim 1, wherein the sleep manager logic is configured to wake the host device when a secure connection is established with a requesting entity having credentials stored in the white list.

8. A method, comprising:
    receiving a request from a requesting entity to wake a host device;
    receiving a white list from authorization manager logic that uses the white list to manage access to the host device when the host device is not in a sleep mode;
    accessing the white list that includes credentials for entities that are authorized to wake the host device;
    determining if credentials for the requesting entity are on the white list; and
    waking the host device when the credentials for the requesting entity are on the white list.

9. The method of claim 8, wherein the credentials comprise a cryptographic authentication credential that uniquely identifies a device.

10. The method of claim 9, wherein the authentication credential comprises a secure sockets layer (SSL) certificate.

11. The method of claim 9, wherein the authentication credential comprises a public encryption key.

12. The method of claim 9, further comprising:
    upon receiving the request to wake the host device, requesting an authentication credential from the requesting entity; and
    matching the authentication credential to authentication credentials stored on the white list.

13. The method of claim 8, further comprising refraining from waking the host device when the credentials for the requesting entity are not on the white list.

14. The method of claim 8, further comprising waking the host device when a secure connection is established with the requesting entity having credentials stored in the white list.

15. A device comprising:
    a network interface controller comprising:
        security interface logic configured to input a white list into a memory, wherein the white list includes credentials for entities that are authorized to wake the device from a power-saving sleep mode;
        a network processor comprising:
            the memory that is configured to store the white list; and
            sleep manager logic configured to:
                receive a request from a requesting entity to wake the device;
                determine if credentials for the requesting entity are on the white list;
                wake the device when the credentials for the requesting entity are on the white list; and
    authorization manager logic configured to use the white list to manage access to the device when the device is not in the power-saving sleep mode.

16. The device of claim 15, further comprising a device CPU that includes the authorization manager logic that is configured to:
    generate the white list by authenticating authorized entities and storing credentials for the authorized entities in the white list; and
    when the device is preparing to enter the sleep mode, transfer a copy of the white list to the sleep manager logic.

17. The device of claim 15, wherein the sleep manager logic is configured to refrain from waking the device when the credentials for the requesting entity are not on the white list, and wherein the credentials comprise a cryptographic authentication credential that uniquely identifies a device.

18. The device of claim 17, wherein the authentication credential comprises a secure sockets layer (SSL) certificate.

19. The device of claim 17, wherein the authentication credential comprises a public encryption key.

20. The device of claim 15, wherein the sleep manager logic is configured to wake the device when a secure connection is established with a requesting entity having credentials stored in the white list.

\* \* \* \* \*